United States Patent
Hares et al.

(10) Patent No.: US 6,432,853 B1
(45) Date of Patent: Aug. 13, 2002

(54) MEDIUM EXPANSION LEADED COPPER BOROALUMINOSILICATE GLASSES

(75) Inventors: George B. Hares; Dianna M. Young, both of Corning, NY (US)

(73) Assignee: Corning Incorporated, Corning, NY (US)

(*) Notice: Subject to any disclaimer, the term of this patent is extended or adjusted under 35 U.S.C. 154(b) by 59 days.

(21) Appl. No.: 09/585,457

(22) Filed: Jun. 1, 2000

(51) Int. Cl.$^7$ .................. C03C 3/091; C03C 3/105; C03C 3/108
(52) U.S. Cl. ............... 501/62; 501/59; 501/61; 501/74; 501/17
(58) Field of Search ............... 501/58, 59, 62, 501/61, 74, 75, 14, 17

(56) References Cited

U.S. PATENT DOCUMENTS

| | | | |
|---|---|---|---|
| 3,414,465 A | 12/1968 | Baak et al. | 161/193 |
| 3,445,212 A | 5/1969 | Bishop | 65/59 |
| 3,451,579 A | 6/1969 | Bishop | 220/2.1 |
| 3,459,569 A | 8/1969 | Ellis | 106/52 |
| 3,498,876 A | 3/1970 | Baak et al. | 161/193 |
| 3,528,829 A | 9/1970 | Baak et al. | 106/52 |
| 3,779,781 A | 12/1973 | Baak et al. | 106/52 |
| 3,999,996 A | * 12/1976 | Faulstich et al. | |
| 4,108,674 A | * 8/1978 | Gliemeroth | |
| 4,149,896 A | * 4/1979 | Faulstich et al. | |
| 4,401,766 A | 8/1983 | Kyle | 501/15 |
| 4,686,196 A | * 8/1987 | Gliemeroth et al. | |
| 4,746,633 A | * 5/1988 | Mazeau et al. | |
| 4,970,122 A | * 11/1990 | Palanisamy | |
| 5,032,546 A | * 7/1991 | Giannelis et al. | |
| 5,032,547 A | * 7/1991 | Giannelis et al. | |
| 5,077,240 A | * 12/1991 | Hayden et al. | |
| 5,141,798 A | * 8/1992 | Chaumonot et al. | |
| 5,145,805 A | * 9/1992 | Tarumi et al. | |
| 5,346,863 A | * 9/1994 | Hikata et al. | |
| 5,534,194 A | * 7/1996 | Borland et al. | |
| 5,567,217 A | * 10/1996 | Goto et al. | |
| 5,616,160 A | * 4/1997 | Alexander et al. | |
| 5,624,782 A | * 4/1997 | Hayakawa et al. | |
| 5,626,935 A | * 5/1997 | Goto et al. | |
| 5,643,840 A | * 7/1997 | Hikata et al. | |
| 5,898,359 A | * 4/1999 | Ellis | |
| 5,992,320 A | * 11/1999 | Kosaka et al. | |
| 6,140,759 A | * 10/2000 | Sreeram et al. | |
| 6,207,268 B1 | * 3/2001 | Kosaka et al. | |

* cited by examiner

Primary Examiner—Tom Dunn
Assistant Examiner—Colleen Cooke
(74) Attorney, Agent, or Firm—Timothy M. Schaeberle; Vincent T. Kung

(57) ABSTRACT

The present invention is directed at a leaded copper boroaluminosilicate glass, having coefficients of thermal expansion (CTES) of between $25-55\times10^{-7}/°C$. (over a range of 25–300° C.) and a softening point in the range of 550–725° C., being suitable for use as a sealing glass, especially for borosilicate glasses, and having a composition consisting essentially, in terms of weight percent on an oxide basis, of 27–60 $SiO_2$, 3–14 $Al_2O_3$, 9–28 $B_2O_3$, 0.0–10 $R_2O$, 0.1–40 PbO, 0.1–11 CuO, where $R_2O$ is an alkali oxide selected from the group consisting of $Li_2O$, $Na_2O$, $K_2O$, $Rb_2O$ and $Cs_2O$.

11 Claims, 3 Drawing Sheets

MEDIUM EXPANSION LEADED COPPER BOROALUMINOSILICATE GLASSES

BACKGROUND OF THE INVENTION

1. Field of Invention

The present invention relates to copper aluminosilicate glasses, and in particular to such new glass compositions of leaded copper boroaluminosilicate suitable for sealing borosilicate glasses or glass-ceramic materials having a high strain point.

2. Description of the Related Art

The joining of component parts together by means of a fused glass seal to form a composite article is a well-cultivated art. In particular, numerous special sealing glasses have been developed for use in joining glass parts with each other, or with metals, alloys, or ceramics. In making a fusion-type seal, the sealing material must be heated to a temperature where it becomes soft enough to wet the sealing surface and form an adhesive, hermetic bond.

The type of glass used in forming a fusion-type seal varies according to the desired properties of the article being sealed. For many purposes, manufacturers want to keep the softening temperature (softening point) as low as possible, while also maintaining a low to medium coefficient of thermal expansion (CTE). This is particularly true for lamp work having electrical and electronic articles where thermally sensitive parts or coatings are commonly used.

Typically, electrical lamps employ borosilicate glass envelopes or bulbs and require joining or sealing of these envelopes to either another piece of glass or metal (usually electrodes) to achieve hermeticity within the glass vessel. Borosilicate glass has a coefficient of thermal expansion (CTE) of $30$–$40 \times 10^{-7}/°C$. The normal CTE for borosilicate lamp glasses, such as Pyrex® (Glass Code #7251) by Corning, is $38 \times 10^{-7}/°C$. The elements enclosed in the glass vessel may include phosphor coatings (fluorescent lamps), metal electrodes, or metallic reflective coatings. Coatings and electrodes require a hermetic environment, otherwise their properties diminish, and as a result the lifetime of the device is dramatically shortened. The coatings elements, however, are typically sensitive to relatively high temperatures, especially greater than 600° C., and thus sealing temperatures must be maintained low, and processing times must be maintained short to avoid decomposition or degradation of these components.

The current workable sealing glasses used in lamps of the type described above are phosphate based frits. Phosphate frits have the advantage of low softening points and, hence, are considered low temperature sealing glasses. Solder glasses currently available can be classified in two categories: 1) leaded phosphate sealing glasses and 2) non-leaded phosphate sealing glasses. Both categories contain compositions that can be classified as vitreous or crystallized, in which crystallized sealing glasses are resistant to deformation under the conditions of reheating in vacuum—an advantage, for example, in television manufacture applications. In the prior art, medium expansion of sealing glasses is established typically by adding low expansion fillers (usually cordierite, lithium aluminosilicate glass-ceramics, or crystalline cobalt pyrophosphate, or magnesium pyrophosphate) to relatively high expansion base glass compositions ($60$–$120 \times 10^{-7}/°C$.) that have a relatively low softening points (350–400° C.).

The two categories of phosphate sealing glasses mentioned above, however, suffer from a number of disadvantages. First, as stated before, to bring down the CTE, phosphate glasses require adding substantial amounts of fillers. The fillers can add significantly to the overall cost of the glass frit. Second, the addition of filler mandates that the sealing glass be used in a powdered form, which is less desirable for tubular geometries. Third, these phosphate frits tend to create seals that are not consistently hermetic when used to seal borosilicate glass, particularly when a desired application calls for the use of a tube geometry. Phosphate glass frits by their inherent nature need to be used in either a dry powder or paste form. Air permeates the seal because the frit powder or paste does not densify completely. Gaps and pores often will appear during the sintering process as the organic binders in the paste de-gas when burned-out under high temperatures. Additionally, as the phosphate frit melts, the glass tends to flow under gravity towards the bottom. Even though, phosphate frits can seal flat glass applications without much problems, some gaps or pores, however small, will always exist between the frit particles in complex geometric applications aside from flat glasses. Moreover, it is difficult to cover or seal certain geometric configurations, such as round or cylindrical forms with loose powder or even paste. Since sealing glasses used in the powdered form are susceptible to porosity within the seal, hermeticity is harder to achieve in the seal.

At the present time, a need for improvement continues to be unsatisfied in the medium-expansion sealing/solder glass industry, especially in seals for electrical lamp constructions such as photoflash lamps, vehicle headlamps and lamps for fluorescent lighting. If one has to use a solder glass to join together various glass articles or pieces that are characterized as having medium expansion, one has limited options.

It is known that all of the various monovalent and divalent oxides are effective in reducing the melting temperature of glass frit. The fluxing power of these oxides is as follows, in decreasing order: $Li_2O > PbO > Na_2O > K_2O > BaO > CaO > SrO > MgO > ZnO$. Replacement of silica by $B_2O_3$ decreases the melting temperature, as does a decrease in the silica, zirconia, and alumina content. Moreover, use of several fluxing ingredients in proper proportion is more effective in decreasing the melting temperature than use of any single oxide. It is also known that in general, those oxides that have the greatest fluxing power give the highest expansion.

As alternatives to phosphate glasses, lead glasses can be used as seals for lamp envelopes. In the past, the glass industry has developed lead sealing glasses for use at relatively low temperatures, in such applications as sealing color television bulbs. For example, stable lead sealing glasses that have softening points in the 430–500° C. range, and coefficients of thermal expansion in the range of $70$–$90 \times 10^{-7}/°C$. are disclosed in U.S. Pat. No. 2,6462,633 (Dalton). Nevertheless, these glasses, in general, still had a relatively high coefficient of thermal expansion, which made them unsuitable for use with borosilicate glasses. Lead-containing frits, likewise, have been deemed unsatisfactory for the same reasons. See, John S. Nordyke, ed., Lead in the World of Ceramics, "Lead Frits," pp. 99–105, The American Ceramic Society (1984). While some of the leaded frit compositions that are disclosed, melt in the relatively low temperature range of 500–675° C., these glasses still exhibit coefficients of thermal expansion that are too high to be compatible with medium expansion glasses, such as borosilicate articles. On the other hand, those leaded frits that exhibit lower coefficients of thermal expansion, melt in the relatively high temperature range of 980–1120° C.

In contrast to the more dense lead glasses, sealing glasses composed essentially of copper aluminum and silicon oxides are known in the art to have low to medium coefficients of thermal expansion that typically do not exceed $20\times10^{-7}/°C.$, and are often lower than $10\times10^{-7}/°C.$, over a broad temperature range. Briefly studied in the 1960s and early 1970s, this property made copper aluminosilicates a favored type of sealing glass for joining fused silica, fused quartz, and other low-expansion glass and glass-ceramics materials.

To illustrate, the following patents describe some of the qualities and applications of copper sealing glasses that are known. U.S. Pat. No. 3,414,465 (Baak et al.) discloses a copper sealing glass used for forming fused quartz to fused quartz seals and fused silica-to fused silica seals. The glass has a composition of 50–90 mol % $SiO_2$, 5–30 mol % $Al_2O_3$, 5–30 mol % $Cu_2O$, 0–6 mol % NiO, 0–6 mol % $Fe_2O_3$, and 0–6 mol % $AlF_3$. The '465 patent describes the copper sealing glasses composition as generally having a coefficient of linear thermal expansion of not more than about $10\times10^{-7}/°C.$ in the temperature range of 0–300° C.

U.S. Pat. No. 3,445,212 (Bishop) teaches a method of sealing a copper lead-in conductor to a surface of a low-expansion silica containing material using a reduced copper sealing glass. The sealing glass is selected from the group of glasses consisting of 75–80 mol % $SiO_2$, 8–12 mol % $Al_2O_3$, 10–15 mol % $Cu_2O$, and a glass consisting of 75–80 mol % $SiO_2$, 8–12 mol % $Al_2O_3$, 10–15 mol % $Cu_2O$, and 1–3 mol % $AlF_3$. The glass composition described in the '212 patent is designed to seal low expansion ceramic, fused quartz or silica bodies with a coefficient of expansion of about $20\times10^{-7}/°C.$ or preferably less in the temperature range of 0–300° C.

U.S. Pat. No. 3,451,579 (Bishop) discloses a vitreous solder glass composition for bonding a fused silica window to a ceramic body lamp, the composition consisting of 75–80 mol % $SiO_2$, 8–12 mol % $Al_2O_3$, 10–15 mol % $Cu_2O$. The '579 patent further discloses a sealing glass consisting of 75–80 mol % $SiO_2$, 8–12 mol % $Al_2O_3$, 10–15 mol % $Cu_2O$, and 1–3 mol % $AlF_3$, with a coefficient of expansion of $4$–$10\times10^{-7}/°C.$ over the temperature range of 0–300° C.

U.S. Pat. No. 3,459,569 (Ellis) discloses glass compositions for sealing and decorating low expansion glass-ceramic materials and borosilicate type glasses. The glass compositions contain 55–70 mol % $SiO_2$, 6–10 mol % $Al_2O_3$, 0–2.5 mol % $MnO_2$, 0–3 mol % $Fe_2O_3$, 5–12 mol % $Cu_2O$, and 10–22 mol % $Li_2O$.

U.S. Pat. No. 3,498,876 (Baak et al.) describes copper-zinc aluminosilicate glasses for sealing with low thermal expansion materials such as fused quartz and fused silica. The glasses have compositions consisting essentially of 50–94 mol % $SiO_2$, 0.5–30 mol % $Al_2O_3$, 1.5–35 total mol % $Cu_2O$ and CuO, and 0.5–20 mol % ZnO; and generally exhibit coefficients of thermal expansion that are not greater than $15\times10^{-7}/°C.$ over the temperature range of 0–300° C.

U.S. Pat. No. 3,528,829 (Baak et al.) reveals glasses that contain copper and are useful for sealing fused quartz, as well as ceramics, metals and related materials. These glasses have compositions consisting essentially of 72–85 mol % $SiO_2$, 2–15 mol % $Al_2O_3$, 2–15 mol % $Cu_2O$, and 1–10 mol % ZnO. The glass composition has a coefficient of thermal expansion of about $10$–$11\times10^{-7}/°C.$ in the temperature range of 0–300° C.

U.S. Pat. No. 3,779,781 (Baak et al.) describes copper aluminosilicate glass compositions containing as essential components 50–94 mol % $SiO_2$, 0.5–30 mol % $Al_2O_3$, 1.5–35 mol % $Cu_2O$, where there is at least 60 mol % silica in ternary compositions. The glasses disclosed are useful as sealing glasses, particularly for fused quartz, since they have a relatively low melting point and coefficients of thermal expansion less than $10\times10^{-7}/°C.$ or less over the temperature range of 0–300° C.

Commercially available copper aluminosilicate sealing glasses have been tested and found to be wanting. Although they form a rigid vitreous seal, these glasses exhibit a tendency to have softening points in excess of 900° C. This means that these glasses require high sealing temperatures, which are not only difficult to control, but also will damage, if not decompose, temperature sensitive electrical components in the articles or devices to be sealed. Further, these glasses require melting temperatures over 1500° C., and have coefficients of thermal expansion that tend to be lower than desired.

Consequentially, a need to formulate a type of sealing glass, without the shortcomings of phosphate glasses, but with relatively low softening points and medium coefficients of thermal expansion, especially suited for borosilicate glasses, continues until the present time. This need has prompted us to further experiment and produce the present, inventive glass compositions.

BRIEF SUMMARY OF THE INVENTION

Given that glass compositions, exhibiting the requisite properties and range of thermal expansion, which would better serve as sealing materials for borosilicate glass articles, appear to be absent from the current marketplace, we have developed a set of new sealing glass compositions. The present invention embodies a sealing glass made from a leaded copper boroaluminosilicate composition, which is particularly suitable for borosilicate glass since the inventive composition have relatively comparable or similar, and inclusive coefficients of thermal expansion with borosilicates at low temperatures. Another advantageous feature of the new glass composition is the relatively low softening point. The sealing glass can seal at such temperatures and for such times that the sealing process used will not cause decomposition or degradation of the heat sensitive components, such as coatings and electrodes in electrical lamps or other lighting devices. Additionally, unlike phosphate frits, the new glass compositions are not necessarily limited to dry powder or paste forms. The leaded copper boroaluminosilicate glass composition of the present invention provides a sealing glass that may be used both in the frit powder form or solid, non-porous bodies of various desired geometries, such as disks, washers, tubes or canes, without the worry of uncontrolled flowing when melted. These and other aspects, features and advantages of this invention will become evident from the following detailed description of the mode and manner of practicing the invention.

One aspect of the present invention, leaded copper boroaluminosilicate glass compositions, has coefficients of thermal expansion (CTEs) of between $25$–$55\times10^{-7}/°C.$ (over a range of 25–300° C.) and softening points of between 550–725° C., and is suitable for use as a sealing glass, especially for borosilicate glasses. These compositions, in terms of weight percent on an oxide basis, consists essentially of 27–60 $SiO_2$, 3–14 $Al_2O_3$, 9–28 $B_2O_3$, 0–10 $R_2O$, 0.1–40 PbO, 0.1–10 CuO, where $R_2O$ is an alkali oxide selected from the group consisting of $Li_2O$, $Na_2O$, $K_2O$, $Rb_2O$, and $Cs_2O$. A preferred composition range consists essentially, in terms of weight percent on an oxide basis, of 31–37 $SiO_2$, 10–12 $Al_2O_3$, 20–25 $B_2O_3$, 0–3 $Li_2O$, 6–34 PbO, 3–11 CuO.

DETAILED DESCRIPTION OF THE INVENTION

Figure 1:
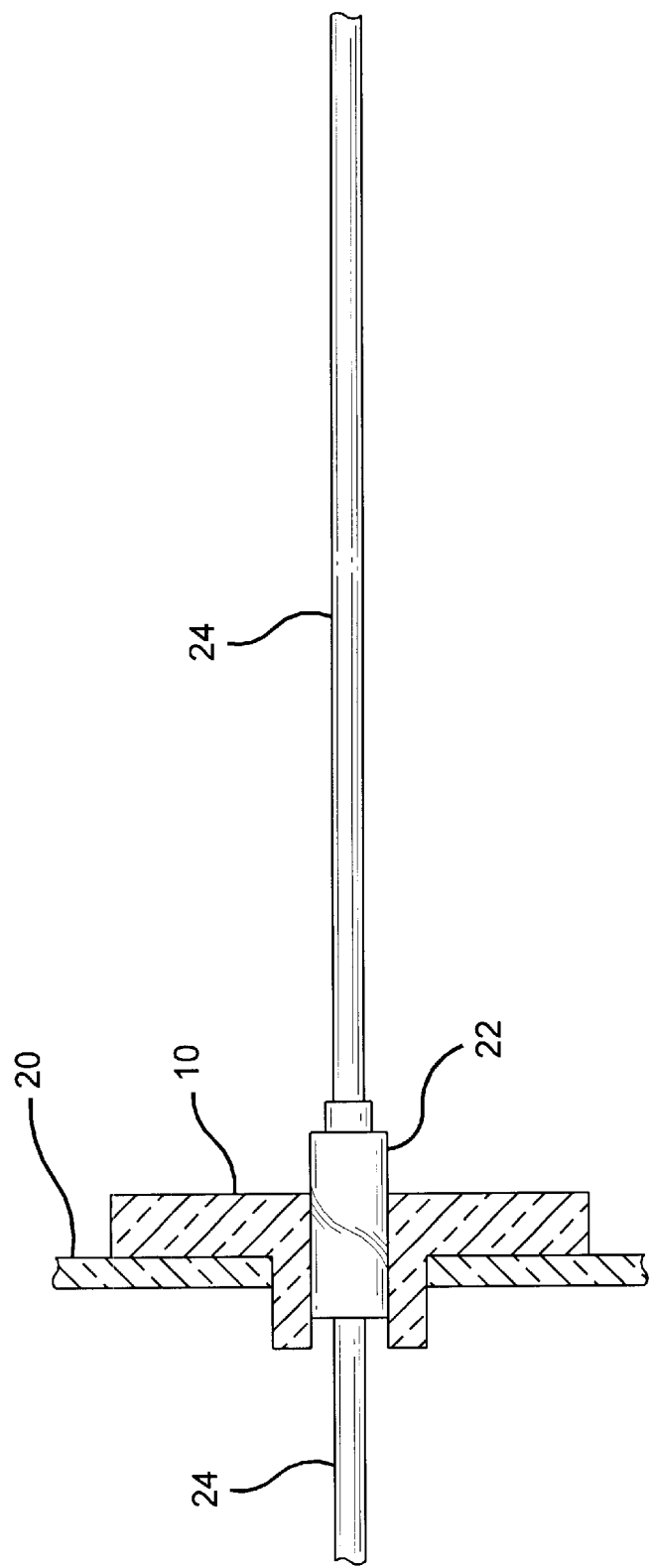
FIG. 1. A schematic, cross-sectional view of a hermetic seal made using a solder glass preform ring with a glass beaded electrode wire lead.

Recently, researchers revisited copper aluminosilicates as low expansion (less than $10 \times 10^{-7}/°C$.) sealing glasses for telecommunication devices (as described in U.S. patent application Ser. No. 09/364,141, entitled Fusion Sealed Article and Method, herein incorporated in its entirety by reference), and optical and opto-electronic components. From that study evolved a search for more effective copper aluminosilicate glasses to soldering heat sensitive materials that exhibited medium expansion characteristics (greater than $20 \times 10^{-7}/°C$.). The present invention is a result. The inventive copper aluminosilicate glasses show CTEs in the range of $25-55 \times 10^{-7}/°C$., over the temperature range of $25-300°$ C., and have relatively low softening points. We believe that the inventive glass compositions are more compatible for use with borosilicate glasses that have CTEs in the range of $30-40 \times 10^{-7}/°C$., or any other glass systems with a medium expansion, defined as a range from $25-55 \times 10^{-7}/°C$., (e.g.: Code #1723 an aluminosilicate, #8082, #8083, #8087 lead silicates, #8088 a borate, all of which are commercially available from Corning Inc.). Since copper glasses normally have low thermal expansion and high softening temperatures, as mentioned before, and lead glasses typically exhibit the reverse characteristics, in our experiments, we combined the desired qualities of copper glasses with those of lead glasses to produce a glass composition with characteristics that lie relatively in the middle.

We discovered that by selectively adding specific amounts of alkali oxides into the composition of the copper glasses, the coefficient of thermal expansion for copper aluminosilicate glass could be raised to a desired value that can match the CTE of a material to be sealed, such as a borosilicate glass. This characteristic is an important feature of the present invention. The alkali oxides function principally as glass network modifiers that lower the softening points of the copper glasses and promote fluxing. The overall effect is to weaken the network structure.

Similar to the alkali oxides, lead oxide helps in the melting and solution of the other batch materials because it is a powerful flux. Generally speaking, lead glass can melt at relatively low temperatures, in the range of $1200-1400°$ C. This means that lead is a good modifier that lowers the softening point. With this fact in mind, we sought to overcome, by a different approach, the problem of how to lower the softening temperature range of copper aluminosilicate glasses without at the same time increasing their CTE values too drastically, which can occur when alkali oxides are used.

With respect to a second major characteristic, we used the presence of lead oxide in the inventive glass compositions to raise the normally low thermal expansion values of copper aluminosilicates to the desired CTE range of the inventive glass. Even though a specific frit composition did reach as low as $47 \times 10^{-7}/°C$., nevertheless in most cases, leaded glasses usually have a high coefficient of expansion in the range of $58-90 \times 10^{-7}/°C$. This means that, in general, lead in glass tends to produce a relatively high coefficient of thermal expansion. But significantly, lead oxide does not raise as dramatically the value of the coefficient of thermal expansion by as much as alkali and alkaline earth metals do, even though it is a material of very high fluxing power. Rather, lead oxide has been observed to have only moderate effects on expansion. This property gave us control over how much we increase CTE in the inventive glass compositions by how much lead oxide we included. Hence by incorporating lead, we were able to lower the softening temperature of the copper aluminosilicate glasses in the batch melts while maintaining a relatively moderate increase in the value of their coefficients of thermal expansion. See, Table A.

Conversely, we found, when starting with lead glass compositions, that the presence of copper in the lead glasses lowers the CTE for the glass by 4 to 50 percent as compared to currently available glass compositions designed for similar functions. Furthermore, by adding CuO to lead sealing glasses, the respective CTE of the lead glasses can be lowered without the sacrifice of increasing their respective softening temperatures. Additionally, even though boric oxide is present in the composition as a network former, boric oxide can still act as a softener for aluminosilicate glasses. Because boron is only trigonally bound to the network, as contrasted to the tetragonal bond of silicate, the network that boric oxide produces is easier to disrupt than a network formed from silicate.

The present, inventive leaded copper boroaluminosilicate sealing glasses, as calculated on an oxide basis in weight percent, consist essentially of: 27–60% $SiO_2$, 3–14% $Al_2O_3$, 9–28% $B_2O_3$, 0.0–10% $R_2O$, 0.1–40% PbO, 0.1–11% CuO, where $R_2O$ is an alkali oxide selected from the group consisting of $Li_2O$, $Na_2O$, $K_2O$, $Rb_2O$, and $Cs_2O$. The glasses of the present invention exhibit CTEs in the range of $25-55 \times 10^{-7}/°C$. over the temperature range of $25-300°$ C., and have low softening points on the order of $550-725°$ C. Although the majority of these softening points are higher than the temperatures at which degradation and decomposition in lamp components take place (i.e., about $600°$ C.), the present inventive glasses are still suitable as sealing glasses.

In all sealing applications the solder glass is used to provide a hermetic seal to replace the more traditional method of glass-to-glass flame sealing, which requires preheating of parts to elevate temperatures above the anneal point of the glass (>550° C.). In lamps that are phosphor coated, an embodiment of lighting devices that would likely incorporate the inventive glasses in their manufacture, we desire to keep the phosphor coating from damage. Thus, it is more advantageous to limit prolonged exposure of the lamp body to elevated temperatures.

Even though copper solder glasses can either be heated using traditional convection heating or heated locally, we discovered that the glasses of the present invention sealed faster when we use small area sealing techniques. The glasses melted more quickly when subjected to infrared (IR) irradiation or any other source that emits long wavelength energy of approximately 1 micron or longer, such as a pinpoint sealing $CO_2$ laser, a hydrogen/oxygen flame, or their equivalents. In these techniques, quick melting minimizes heat flow to the rest of the particular glass or glass ceramic article being sealed. During the soldering process, we apply heat energy in a direct, concentrated and intense fashion to a small portion of the article, at the solder joint where the inventive sealing glasses will be melted. The inventive sealing glass being irradiated at that portion absorbs the irradiation more efficiently, and heats faster than the rest of the glass of the article, which induces faster melting of the sealing glass and sealing of the article. While the temperature of the small area that had the heating source focused upon it rises and becomes hot enough to melt, the rest of the glass article containing the electrical lamp and its electrical components remains relatively cool. Those sensitive components and their surrounding glass structures in the article are protected and exposed to the least amount of heat necessary during the soldering process. For example, because the substrate glass that forms the envelope of an electrical lamp is a different type of glass, such as borosilicate, than the leaded copper sealing glass, which has a particular affinity to long-wavelength energy heating, the envelope does not absorb long wavelengths such as infrared. Thus, the lamp and electrical components are not heated to the point where degradation and decomposition can even begin to occur.

Not intending to be bound by theory, we believe that the lower melting temperature of the inventive glasses, described above, is a function of the composition and particularly due to the copper being in the glass. The glasses contain both cupric, $Cu^{2+}$, and cuprous copper ions, $Cu^{1+}$. The new leaded copper glasses absorb infrared irradiation more efficiently than the substrate glass that forms the lamp envelope. For this reason, the copper ions aid in the absorption of long wavelengths used in spot heating the sealing glass during the soldering process. The lamp envelope does not readily absorb at one micron, or absorbs very little at that wavelength.

These properties are optimized in a family of preferred compositions, again in weight percent on a calculated oxide basis, that consist essentially of: 31–37% $SiO_2$, 10–12% $Al_2O_3$, 21–25% $B_2O_3$, 0.0–3% $R_2O$, 6–34% PbO, 3–11% CuO, where $R_2O$ is an alkali oxide selected from the group consisting of $Li_2O$, $Na_2O$, $K_2O$, $Rb_2O$, and $Cs_2O$. The preferred copper aluminosilicate glasses demonstrate CTEs in the range of 35–43×$10^{-7}$/°C. over the temperature range of 25–300° C., and softening points of about 575–690° C.

When we prepared the glass compositions of the present invention, we formulated and mixed batches of glass in conventional manner. The batch ingredients were compounded, and thoroughly mixed together to secure a homogeneous melt. We melted each batch of the starting compounds, in their respective proportions, in silica crucibles at temperatures ranging from 1200–1500° C. for 4 hours in an electric furnace. At the end of the four hours, we poured the glass melt onto steel plates to provide the test pieces for physical analysis. These glasses were annealed at temperatures ranging from 400–500° C. The glasses produced by this process exhibited a dark green to blackish color. Table A. summarizes several examples of the glass compositions of the present invention, where the respective amounts of the starting oxides are specified, and the respective coefficient of thermal expansion and resulting softening points are reported. These examples are merely illustrative and not to be construed as limiting the invention.

TABLE A

Copper Lead Boroaluminosilicate Compositions, Thermal Expansion, & Softening Point

| | Oxides (wt %) | | | | | | | |
|---|---|---|---|---|---|---|---|---|
| Example No. | $SiO_2$ | $Al_2O_3$ | $B_2O_3$ | CuO | PbO | $R_2O$ | CTE ($\alpha \times 10^{-7}$/° C.) | Soft. Pt. (° C.) |
| 1. | 59.2 | 3.27 | 23.9 | 3.48 | 6.51 | 3.62 ($Na_2O$) | 40 | 682 |
| 2. | 29.0 | 9.42 | 19.3 | 3.27 | 39.0 | — | 46 | 597 |
| 3. | 49.5 | 5.35 | 10.2 | 3.98 | 29.3 | — | 40 | 633 |
| 4. | 33.0 | 10.7 | 22.0 | 5.57 | 28.7 | — | 40 | 616 |
| 5. | 34.1 | 11.1 | 24.3 | 7.69 | 24.3 | — | 37 | 612 |
| 6. | 36.7 | 11.9 | 24.4 | 12.4 | 14.5 | — | 32 | 645 |
| 7. | 53.3 | 5.76 | 11.0 | 8.56 | 19.8 | — | 34 | 682 |
| 8. | 38.1 | 12.4 | 25.3 | 15.0 | 9.03 | — | 28 | 650 |
| 9. | 45.3 | 4.90 | 9.33 | 1.82 | 37.3 | 1.23 ($Li_2O$) | 47 | 610 |

Persons working in the art can recognize that, whereas the process described above is directed toward laboratory activity, the glasses operable in the invention can be melted in large commercial melting units and formed into desired shapes by conventional glass melting and forming practices. The compositions need to be fired at sufficiently high temperatures and for a sufficient period of time to produce a homogeneous melt. Thereafter, the melt can be cooled and simultaneously shaped into a glass preform that is annealed and prepared for use as a seal.

In contrast to the shortcomings of phosphate-based frits, the leaded copper boroaluminosilicate glasses described above can be manipulated into various physical forms, a novel feature of the invention. They may be formed into solid geometries, such as bulk glass, disks, washers, drawn as cane, tubes or fiber, as well as pulverized to into conventional glass sealing frit powder. Being able to use the glass in various forms permits maximum flexibility for us to accommodate complex geometries in the glass sealing of electrical lamps or optical components. Using the new glass in the form of bulk glass, disks, washer, cane, tubing, fiber, or ribbon not only eliminates the problems associated with sintering conventional frit powder applications, because the sealing glass can conform to the shape of the required seal, but it can also maximize or even eliminate the pores that are left within the seal as a natural consequence when frit powder is melted. Hence, we can more readily achieve hermeticity of the seal.

Figure 2:
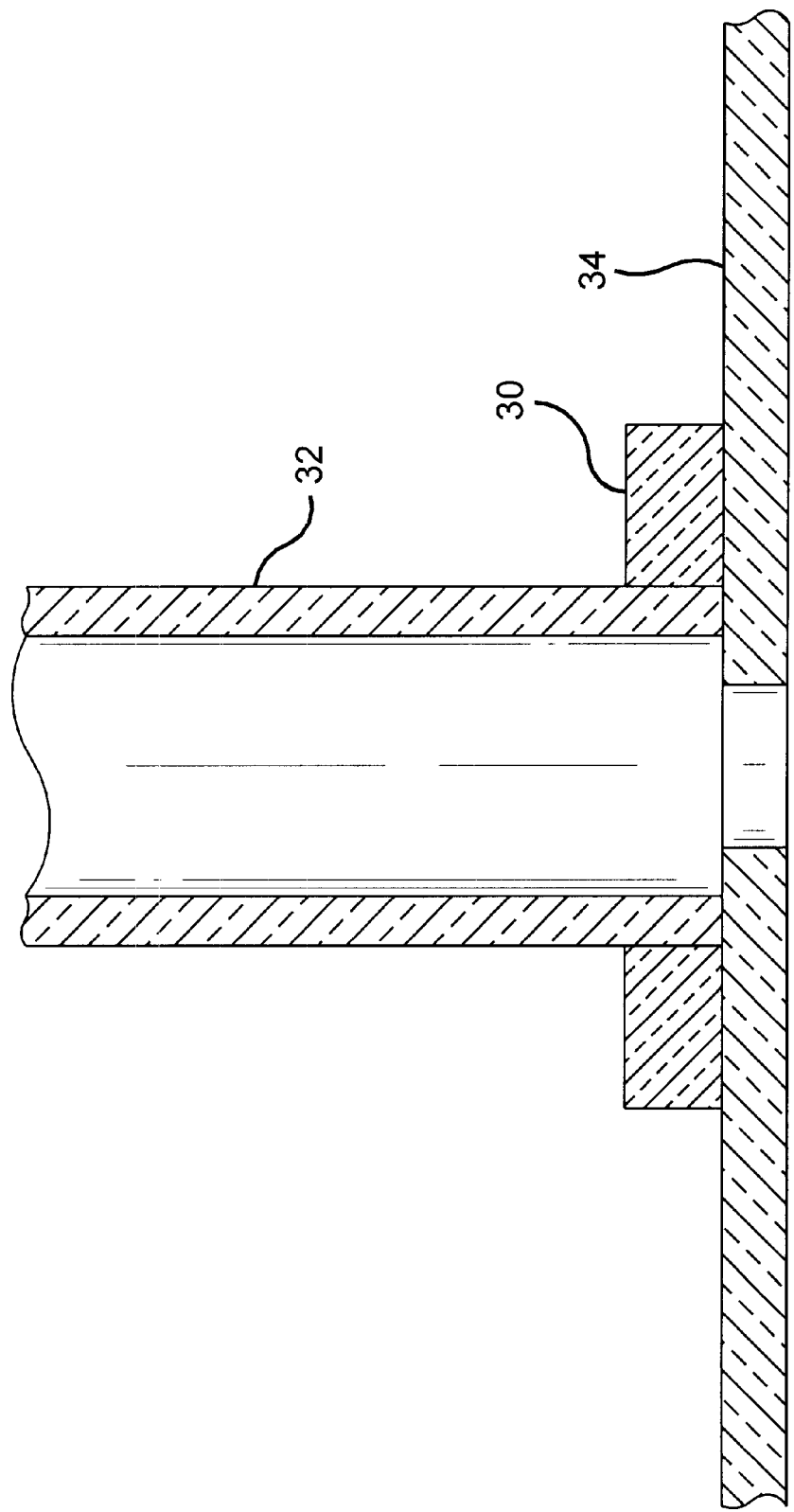
FIG. 2. A schematic, cross-sectional view of a tubulation seal made using a solder glass perform washer.
Figure 3:
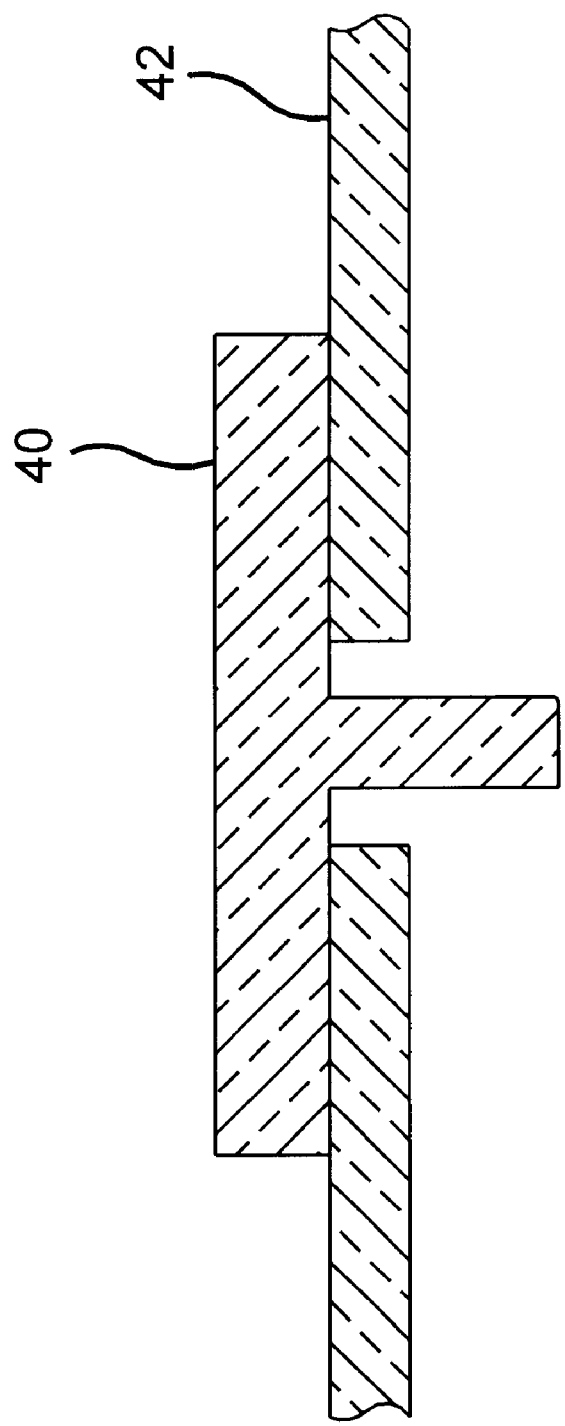
FIG. 3. A schematic, cross sectional view of a plug seal made using a solder glass preform plug.

FIGS. 1 through 3 exemplify in schematic drawings a few of the many different uses for hermetic sealing, which we have experimented, of the inventive glass composition. The illustrations show cross-sectional views of "preform" shapes in various geometries as the glass seals could look like prior to heating and subsequent "flow" to produce the hermetic seal. The material can also be in "paste"form to do the same thing, but as discussed earlier, the inventive glasses permitted solid forms an easier task to draw in geometrical shapes. FIG. 1 shows in cross-section a hermetic seal for an electrode. The seal is made by using a solder glass preform ring (10) that fits against a glass wall (20) and a glass (bead) sleeve (22) with an electrode lead wire (24) passing through it. This type of seal is currently being used in lighting articles and devices such as vacuum lamps (incandescent, fluorescent, HID), and may be usable in the art of telecommunication devices or opto-photonic components in the foreseeable future. FIG. 2 illustrates an example of a tubulation seal made using a solder glass preform washer-ring (30). This type of seal joins a glass tube (32) with a glass wall (34) of an article or device. To illustrate a use of this kind of seal, during lamp processing, exhaust tubulations of typical vacuum lamps are used for the purpose of providing a temporary connection to an exhaust machine. During a typical exhaust process, a lamp is evacuated and back-filled with inert gas through the exhaust tube. As a final step, the exhaust tube is heated (tipped-off) by flame and the lamp removed, resulting in a hermetically sealed lamp. FIG. 3 shows a simple plug seal made using a solder glass preform plug (40) of an opening in the glass wall (42) of an article or device. Plug seals can be used in flat panel displays (FPD), for example, where devices are processed without exhaust tubulations in a vacuum chamber. Flat panel displays have become quite prevalent as substrates in liquid crystal display devices and the emerging flat TV technology. A plug seal provides a means of hermetically sealing the FPD after evacuating and back-filling. In some cases, the inventive glass is particularly adaptive as a solder glass to hermetically seal holes after phosphor filling and draining.

The inventive leaded copper glass compositions described herein-are suitable for sealing a variety of medium expansion glasses, where borosilicates are a primary example. Nonetheless, any medium expansion glass or glass-ceramic materials could be also sealed with these leaded copper glass compositions, using the various physical forms into which the glass can be molded. Although the present invention has been fully described by way of examples, it is to be noted that various changes and modifications will be apparent to those skilled in the art. Therefore, unless such changes and modifications otherwise depart from the scope of the present invention, they should be construed as included therein.

What is claimed is:

1. A leaded, copper boroaluminosilicate glass having a composition, as expressed in weight percent on an oxide basis, that consists essentially of: about 27% to about 60% $SiO_2$; about 3% to about 14% $Al_2O_3$; about 9% to about 28% $B_2O_3$; about 0.1% to about 40% PbO; about 0.1% to about 11% CuO; and including 0.0% to about 10% $R_2O$, wherein $R_2O$ is an alkali oxide selected from the group consisting of $Li_2O$, $K_2O$, $Na_2O$, $Rb_2O$, and $Cs_2O$; and said glass has a coefficient of thermal expansion (CTE) in the range of about $25–55\times10^{-7}/°C$. over a temperature range of 25–300° C.

2. The glass according to claim 1, wherein said glass has a softening point in the range of 550–725° C.

3. The glass according to claim 1, wherein said glass as a CTE in the range of about $25–46\times10^{-7}/°C$. over a temperature range of 25–300° C.

4. The glass according to claim 1, wherein said glass has an affinity to absorb infrared-irradiation and exhibits quick heating and wetting when thus irradiated.

5. The glass according to claim 1, wherein said composition, as expressed in weight percent on an oxide basis, consists essentially of: about 31% to about 37% $SiO_2$; about 10% to about 12% $Al_2O_3$; about 21% to about 25% $B_2O_3$; about 6% to about 34% PbO; about 3% to about 11% CuO; and including 0.0% to about 3% $R_2O$, wherein $R_2O$ is an alkali oxide selected from the group consisting of $Li_2O$, $K_2O$, $Na_2O$, $Rb_2O$, and $Cs_2O$, and said glass has a coefficient of thermal expansion (CTE) in the range of about $35–43\times10^{-7}/°C$. over a temperature range of 25–300° C.

6. A leaded, copper boroaluminosilicate glass having a medium coefficient of thermal expansion (CTE) and a composition, in weight percent, consisting essentially of: 27–60% $SiO_2$; 3–14% $Al_2O_3$; 9–28% $B_2O_3$; 0.1–40% PbO; 0.1–11% CuO; and 0.0–10% $R_2O$, wherein $R_2O$ is an alkali oxide selected from the group consisting of $Li_2O$, $K_2O$, $Na_2O$, $Rb_2O$, and $Cs_2O$; and said glass having a softening point in the range of about 550–710° C.

7. The glass according to either claim 1 or 6, wherein said glass is a sealing glass suitable for use with a material having a coefficient of thermal expansion (CTE) in the range of $25–55\times10^{-7}/°C$. over a temperature range of 25–300° C.

8. The glass according to claim 1, wherein said glass is a sealing glass that has a solid geometry other than a granular form.

9. The glass according to claim 8, wherein said sealing glass has a solid geometry in the form of one of the following: bulk glass, disk, washer, cane, tube, ribbon, or fiber.

10. The glass according to claim 1, wherein said glass is a sealing glass in the form of a frit with either a powder or paste consistency.

11. The glass according to claim 1, wherein said glass is a sealing glass suitable for use with ceramic articles made of materials consisting of: borosilicates, aluminosilicates, lead silicates, glass-ceramic materials, or high-strain-point glass-ceramic materials.

* * * * *